United States Patent
Hibbs et al.

(10) Patent No.: US 9,941,757 B2
(45) Date of Patent: Apr. 10, 2018

(54) FLUX CONCENTRATOR FOR IRONLESS MOTOR

(71) Applicant: AeroVironment, Inc., Simi Valley, CA (US)

(72) Inventors: Bart Dean Hibbs, Simi Valley, CA (US); Bang Xuan Phan, Rancho Santa Margarita, CA (US)

(73) Assignee: AeroVironment, Inc., Monrovia, CA (US)

( * ) Notice: Subject to any disclaimer, the term of this patent is extended or adjusted under 35 U.S.C. 154(b) by 223 days.

(21) Appl. No.: 14/994,130

(22) Filed: Jan. 12, 2016

(65) Prior Publication Data

US 2016/0211710 A1    Jul. 21, 2016

Related U.S. Application Data

(62) Division of application No. 12/565,718, filed on Sep. 23, 2009, now Pat. No. 9,270,154.

(Continued)

(51) Int. Cl.
*H02K 1/27* (2006.01)
*H02K 51/00* (2006.01)
(Continued)

(52) U.S. Cl.
CPC ............ *H02K 1/2706* (2013.01); *H02K 1/27* (2013.01); *H02K 1/2786* (2013.01); *H02K 3/02* (2013.01);
(Continued)

(58) Field of Classification Search
CPC ...... H02K 1/2706; H02K 1/27; H02K 1/2786; H02K 1/22; H02K 3/02; H02K 3/28; H02K 7/1838
(Continued)

(56) References Cited

U.S. PATENT DOCUMENTS 5,331,244 A * 7/1994 Rabe ................ H02K 21/12
                                                  310/156.26
5,723,933 A * 3/1998 Grundl .............. H02K 3/04
                                                  310/266
(Continued)

FOREIGN PATENT DOCUMENTS

JP    2008037769        2/1996
JP    2007006545 A      1/2007

OTHER PUBLICATIONS

Korean Intellectual Property Office (KIPO): First Office Action (OA1) for corresponding Korea case application No. 10-2017-7012793 entitled Flux Concentrator for Ironless Motor by Hibbs et al.; dated Jul. 11, 2017 from Korean Intellectual Property Office; 5 pgs.

(Continued)

*Primary Examiner* — Michael Andrews
(74) *Attorney, Agent, or Firm* — Christopher R. Balzan; Eric J. Aagaard

(57) ABSTRACT

In one possible embodiment, a magnet array for a motor is provided which has an array of permanent magnets being arranged such that flux from the permanent magnets reinforce on one side of the array and substantially cancel on an opposite side of the array, the array further includes flux concentrators located at poles on the reinforcing side of the array.

20 Claims, 5 Drawing Sheets

Related U.S. Application Data

(60) Provisional application No. 61/194,056, filed on Sep. 23, 2008, provisional application No. 61/194,099, filed on Sep. 23, 2008.

(51) Int. Cl.
    *H02K 21/12* (2006.01)
    *H02K 7/18* (2006.01)
    *H02K 3/02* (2006.01)
    *H02K 3/28* (2006.01)

(52) U.S. Cl.
    CPC ............ *H02K 3/28* (2013.01); *H02K 7/1838* (2013.01); *H02K 21/12* (2013.01); *Y02E 10/725* (2013.01)

(58) Field of Classification Search
    USPC .................. 310/156.07, 156.43, 156.53, 266
    See application file for complete search history.

(56) References Cited

U.S. PATENT DOCUMENTS

| | | | |
|---|---|---|---|
| 6,169,352 | B1 | 1/2001 | Hull |
| 7,053,508 | B2 | 5/2006 | Kusase et al. |
| 8,446,054 | B2 | 5/2013 | Toyota et al. |
| 8,604,652 | B2 | 12/2013 | Sheppard et al. |
| 8,723,378 | B2 | 5/2014 | Daboussi et al. |
| 9,035,526 | B2 | 5/2015 | Rippel et al. |
| 2005/0040721 | A1* | 2/2005 | Kusase .................. H02K 1/278 310/156.43 |
| 2005/0236918 | A1 | 10/2005 | Van Den Bergh et al. |
| 2006/0138879 | A1* | 6/2006 | Kusase .................. H02K 21/12 310/266 |
| 2008/0224557 | A1 | 9/2008 | Cleveland |

OTHER PUBLICATIONS

Canadian Intellectual Property Office (CIPO) First Office Action (OA1) and Examination Search Report (Search_Rpt) for corresponding Canada case application No. 2,774,926 entitled Flux concentrator for ironless motor by Hibbs et al.; dated Oct. 4, 2016 from Canadian Intellectual Property Office; 13 pgs.

Korean Intellectual Property Office (KIPO): Final Office Action (FOA) for corresponding Korea case application No. 10-2011-7009284 entitled Flux Concentrator for Ironless Motor by Hibbs et al.; dated Oct. 27, 2016 from Korean Intellectual Property Office; 6 pgs.

International Searching Authority; International Search Report (ISR) for corresponding PCT case application No. PCT/US2009/058122 entitled Flux concentrator for ironless motor by Hibbs et al.; dated Mar. 29, 2010 from US International Searching Authority; 2 pgs.

International Searching Authority; Written Opinion (WO) of the International Searching Authority and Search History for related PCT case application No. PCT/US2009/058122 entitled Flux concentrator for ironless motor by Hibbs et al.; dated Mar. 29, 2010 from US International Searching Authority; 8 pgs.

Halbach Array, Wikipedia, the free encyclopedia, http://en.wikipedia.org/wiki/Halbach_array, accessed Sep. 21, 2009, 8 pgs.

H.C.Lovatt, et al, Design of an in-wheel motor for a solar-powered electric vehicle, 8th International Conference of Electrical Machines and Drives, EMDSep. 1-3, 1997, Conference Publication No. 444, IEEE 1997, pp. 234-238, 6 pgs.

Australian Government IP Australia, (AU) Examiner's First Report (Exam_Report) for corresponding Australia case application No. 2009296688 entitled Flux Concentrator for Ironless Motor by Hibbs et al., Sep. 23, 2009, Australia Government Intellectual Australia, Aug. 8, 2011, 2 pgs.

European Patent Office (EPO); Supplementary European Search Report (ESR); and Annex to the ESR for corresponding European case application No. EP 09 81 6821 entitled Flux Concentrator for Ironless Motor by Hibbs et al.; dated Dec. 13, 2012 from European Patent Office; 7 pgs.

State Intellectual Property Office (SIPO): First Office Action (1OA) and Search Report (Search_Rpt) for corresponding China case application No. 200980146816.2 entitled Flux Concentrator for Ironless Motor by Hibbs et al.; dated Feb. 6, 2013 from State Intellectual Property Office of the People's Republic of China; 11 pgs.

Hungarian Intellectual Property Office (HIPO) Search Report and Written Opinion (WO); for corresponding Singapore case application No. 201104426-0 entitled Flux Concentrator for Ironless Motor by Hibbs et al.; dated Jun. 13, 2013 from Hungarian Intellectual Property Office; 14 pgs.

Japan Patent Office (JPO) Office Action (OA) for corresponding Japanese Patent Application No. 2011-529201 Entitled Flux concentrator for ironless motors by Hibbs et al., dated Jan. 28, 2014 from Japan Patent Office, 2 pgs.

Hungarian Intellectual Property Office (HIPO) Examination Report (Exam_Rpt); for corresponding Singapore case application No. 201104426-0 entitled Flux Concentrator for Ironless Motor by Hibbs et al.; dated May 15, 2014 from Hungarian Intellectual Property Office; 10 pgs.

Korean Intellectual Property Office (KIPO): First Office Action (1OA) for corresponding Korea case application No. 10-2011-7009284 entitled Flux Concentrator for Ironless Motor by Hibbs et al.; dated Jan. 11, 2016 from Korean Intellectual Property Office; 10 pgs.

Korean Intellectual Property Office (KIPO): Notice of Final Rejection (FOA2) for corresponding Korea case application No. 10-2011-7009284 entitled Flux Concentrator for Ironless Motor by Hibbs et al.; dated Feb. 9, 2017 from Korean Intellectual Property Office; 4 pgs.

Intellectual Property India (IPI): First Examination Report (FER) for corresponding Indian case application No. 1662/KOLNP/2011 entitled Flux Concentrator for Ironless Motor by Hibbs et al.; dated Dec. 14, 2017 from Intellectual Property India, 9 pgs.

* cited by examiner

FLUX CONCENTRATOR FOR IRONLESS MOTOR

CROSS REFERENCE TO RELATED APPLICATIONS

The present application is a divisional of U.S. patent application Ser. No. 12/565,718, filed Sep. 23, 2009, by Hibbs et al., entitled FLUX CONCENTRATOR FOR IRONLESS MOTORS, herein incorporated by reference in its entirety, which claims the benefit of the following applications which are herein incorporated by reference in their entireties:

U.S. Provisional Application No. 61/194,056, filed Sep. 23, 2008, by Bart Dean Hibbs, entitled FLUX CONCENTRATOR FOR IRONLESS MOTORS; and U.S. Provisional Application No. 61/194,099, filed Sep. 23, 2008, by Daboussi et al., entitled PROPELLER DRIVE UNIT FOR HALE UAV.

The present application is also related to the following applications, which are hereby incorporated by reference in their entireties:

U.S. Non-provisional application Ser. No. 12/565,705, filed Sep. 23, 2009, entitled COMPRESSED MOTOR WINDING, by Rippel et al., U.S. Pat. No. 9,035,526, Issued May 19, 2015;

U.S. Non-provisional Application No. 12/565,715, filed Sep. 23, 2009, entitled MOTOR AIR FLOW COOLING, by Sheppard et al., U.S. Pat. No. 8,604,652, Issued Dec. 10, 2013; and U.S. Non-provisional application Ser. No. 12/565,710, filed Sep. 23, 2009, entitled STATOR WINDING HEAT SINK CONFIGURATION, by Daboussi et al., U.S. Pat. No. 8,723,378, Issued May 13, 2014.

BACKGROUND

Electric motors for vehicles need to have high efficiency to conserve power. Furthermore, in unmanned or manned vehicles, light weight and compact electric motors are also desirable. Thus, ironless motors are often used which can provide the benefit of no iron losses due to changing flux direction. Ironless motors, however, suffer from poor field strength in the gap.

Motors are normally rated for the peak power and efficiency of the motor. In some applications, high part load efficiency is desired, which is high efficiency when machine is loaded at a partial load, i.e. 15% or some other percent.

What is needed is a higher efficiency compact motor.

SUMMARY

In one possible embodiment, a magnet array for a motor is provided which has an array of permanent magnets being arranged such that flux from the permanent magnets reinforce on one side of the array and substantially cancel on an opposite side of the array, the array further includes flux concentrators located at poles on the reinforcing side of the array.

In another possible embodiment, a magnet array is provided for a motor having an array of permanent magnets arranged such that flux from the permanent magnets reinforce on one side of the array and substantially cancel on an opposite side of the array. In this embodiment, the magnets are arranged such that the magnetic moments of adjacent magnets are oriented in directions separated by about 45 degrees, and such that a magnet within the array comprises a magnetic moment oriented generally perpendicular to the reinforcing side of the array.

The embodiments may be combined and other embodiments are possible.

BRIEF DESCRIPTION OF THE DRAWINGS

The features and advantages of the present invention will be better understood with regard to the following description, appended claims, and accompanying drawings where:

DESCRIPTION

Figure 1:
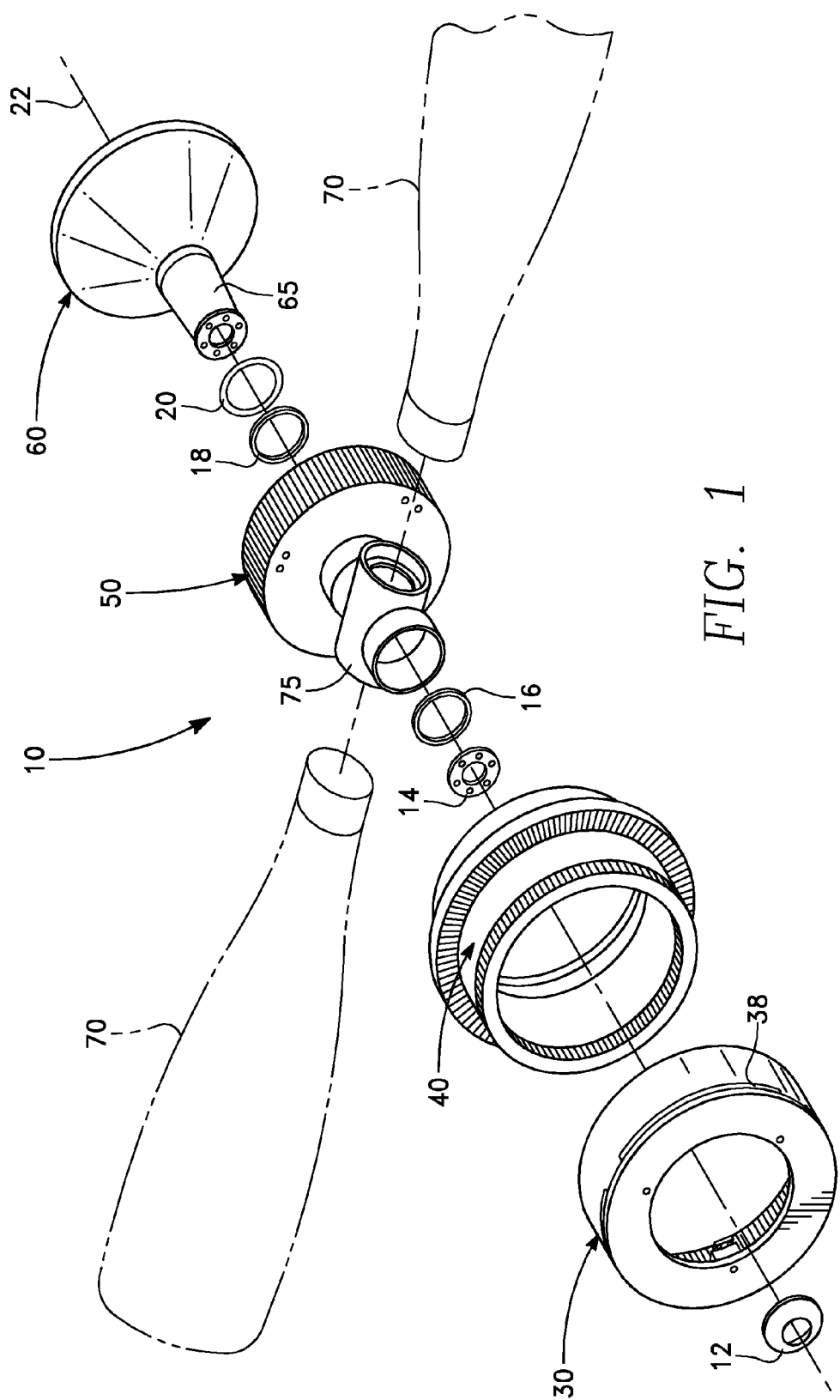
FIG. 1 shows a simplified exploded perspective view of an example motor.

FIG. 1 shows a simplified exploded perspective view of an example motor 10 along axis 22. A stator 40 is secured to a housing 60. Inner rotor 50 and outer rotor 30 are secured to each other and surround the stator 40. An optional propeller hub 75, into which propeller blades 70 are mounted, is secured to the inner rotor 50. The propeller hub 75 rotatably mounts on the spindle 65 with bearings 16 and 18. The bearings 16 and 18 are retained by retainers 20 and 14 and cover 12.

Figure 2:
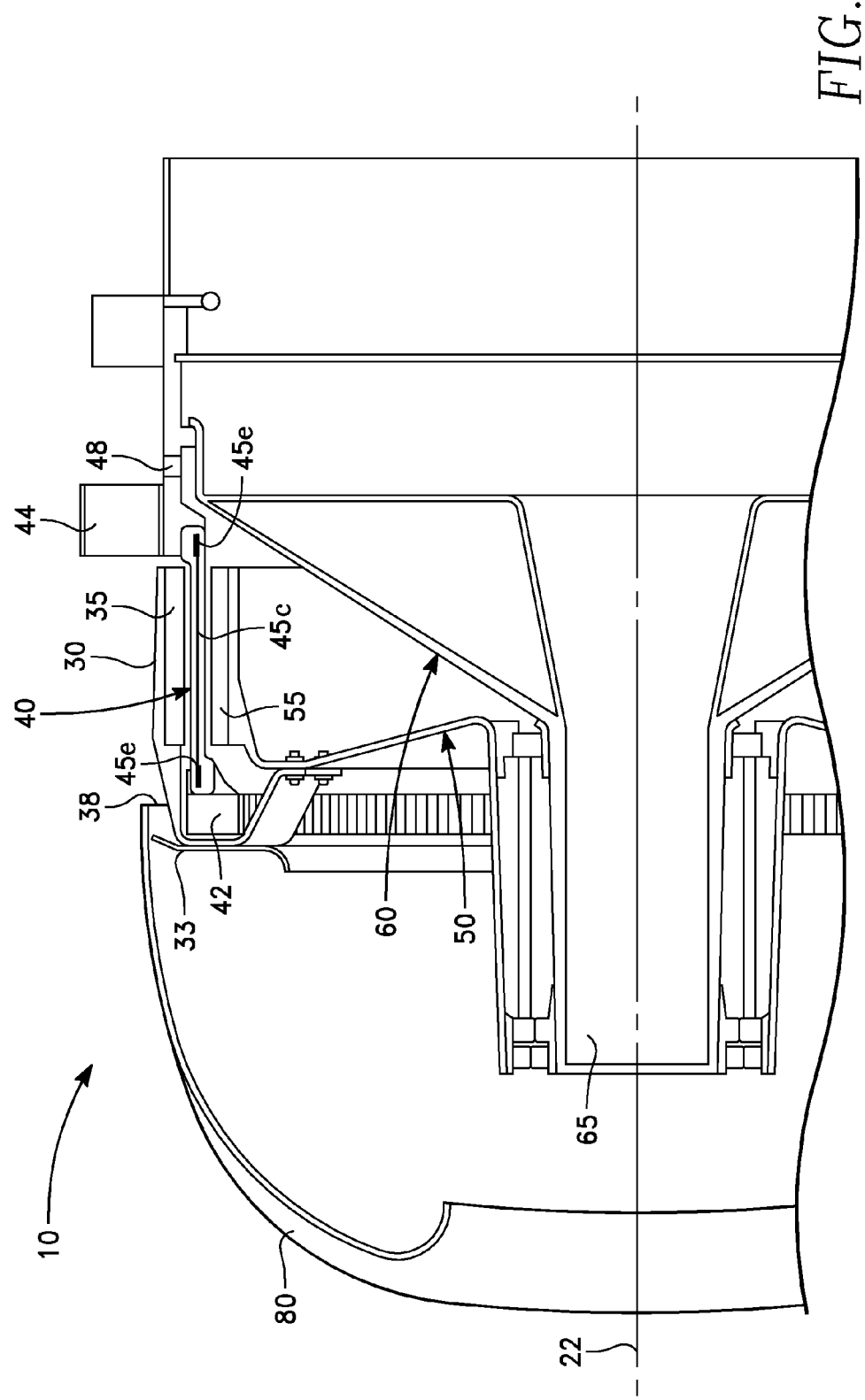
FIG. 2 shows a simplified cross sectional side view of the motor of FIG. 1 along its longitudinal axis.

FIG. 2 shows a simplified cross-sectional side view of the motor 10 of FIG. 1 along its longitudinal axis 22. The stator 40 is located between magnets 35 and 55 of the inner and outer rotors 50 and 30, respectively. The propeller hub 75 is bonded to the inner rotor 50 which is rotatably mounted on the spindle 65. The spindle 65 may be fabricated of carbon fiber or other suitable material.

Figure 3:
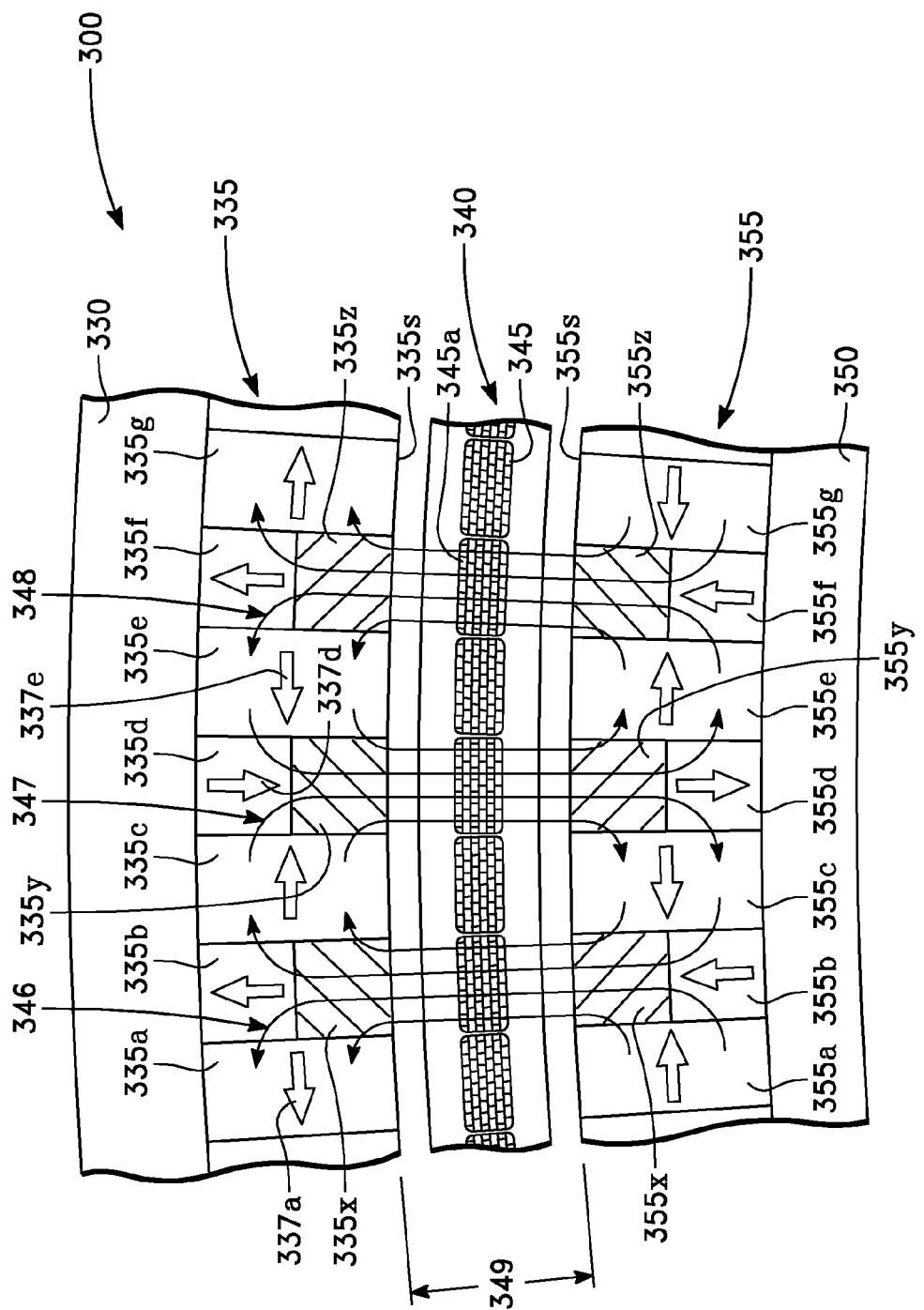
FIG. 3 shows a simplified cut away front view of a portion of a possible embodiment of a permanent magnet motor.

FIG. 3 shows a simplified cut away front view of a portion 300 of a possible embodiment of a permanent magnet motor. In FIG. 3, a stator 340 having a winding 345 is located between inner and outer magnet assemblies 355 and 335 of inner and outer rotors 350 and 330.

The inner and outer magnet assemblies 355 and 335 have magnets 355$a$-$g$ and 335$a$-$g$ arranged with the permanent magnetic fields oriented as indicated by arrows within the magnets 355$a$-$g$ and 335$a$-$g$. The magnetic orientations 357$a$-$g$ of magnets 355$a$-$g$, or the magnetic orientations 337$a$-$g$ of magnets 335$a$-$g$, are similar to those in a Halbach array. In a Halbach array, permanent magnets are arranged such that flux from the permanent magnets reinforce on one side of the array and substantially cancel on an opposite side of the array. Distinguished from a Halbach array, however, various embodiments have flux concentrators 335$x$-$z$ and 355$x$-$z$, provided in the inner and outer magnet assemblies 355 and 335.

The flux concentrators 335$x$-$z$ and 355$x$-$z$ increase the flux density B onto the area of the winding 345. The force and therefore the torque resulting from the flux density B is calculated from this formula F=B×I×L, where I is the current in the wire and L is the length of the wire in the B field. Thus, increasing the B field density on each Litz wire 345$a$, increases the force F on the in the wire 340$a$. Increasing the flux concentration on the same wire, at the same length and current, results in higher force on the wire 340a to improve efficiency. Without the flux concentrators 335x-z and 355x-z fringing can occur which reduces the flux density in the wire 345a.

Figure 5A:
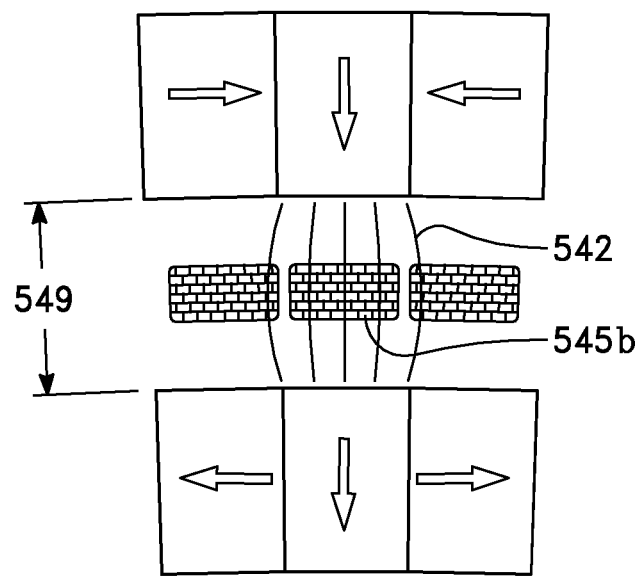
FIGS. 5A & B are a simplified cut away front views illustrating a B field in a permanent magnet motor without and with flux concentrators, respectively.
Figure 5B:
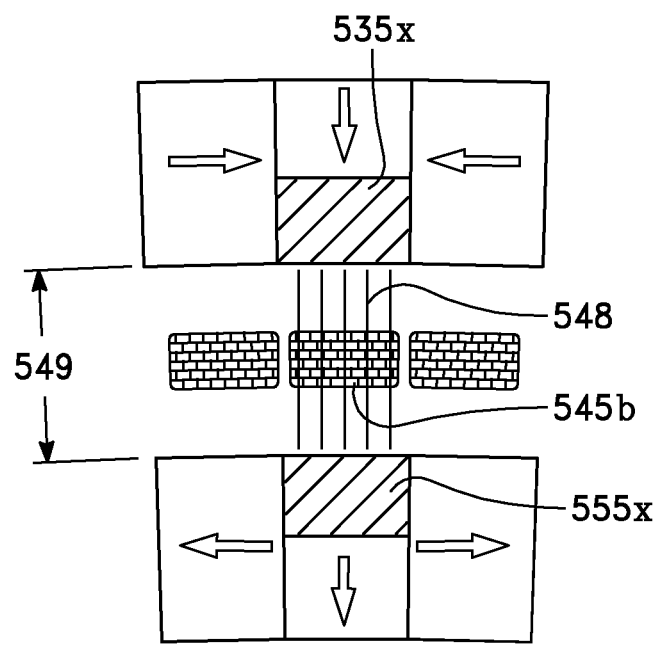

FIG. 5A is a simplified cut away front view illustrating how the B field 542 in the gap 545b fringes without the flux concentrators, resulting in less flux density in the conductor 545b. With flux concentrators 535x and 555x as shown in FIG. 5B, however, the B field 548 has higher density in the wire 545b.

Referring to FIG. 3, the flux concentrators 355x-z and 335x-z are located within the inner and outer magnet assemblies 355 and 335 in opposing positions across the gap 349. They are located in positions where the magnetic fields 346, 347, and 348 reinforce, and in positions where the magnetic fields 346, 347, and 348 cancel, on opposing surfaces 335s and 355s of the gap 349. The flux concentrators 355x-z are located between the gap 349 and respective back magnets 355b, 355d, and 355f. Similarly, the flux concentrators 335x-z are located between the gap 349 and respective back magnets 355b, 355d, and 355f.

The flux concentrators 355x-z and 335x-z may be made of iron, or other magnetic material. The iron material form poles that collect and concentrate the flux from the magnets. Field strength is limited in readily available permanent magnets to about 1 Tesla. Iron on the other hand, can support 2 Teslas. By using poles along with magnets to force flux across the gap 349, a greater fields 346, 347, and 348, in the gap 349 may be possible. Motor torque is proportional to the field, so as at a fixed torque, doubling the field cuts the I$^2$R losses by ¼.

As used herein, ironless motor means no iron in the winding. The flux concentrators are not limited to iron and may be made of other magnetic materials and high magnetic moment materials.

Although shown as one half the thickness of the corresponding back magnets 335b, 335d, and 335f, the flux concentrators 335x, 335y, and 335z may be larger, or smaller than the back magnet, depending on the materials used and the strength of the magnets. Furthermore, the respective widths of the between magnets 335a, 335c, 335d, and 335g, and the flux concentrator and/or the back magnets 335b, 335d, 335f, may be different and need not be equal.

The spacing and orientations/periodicity of the magnets with respect to the number and spacing of windings in the rotor should be matched, so that the fields in the gap generate additive currents in the stator windings.

Figure 4:
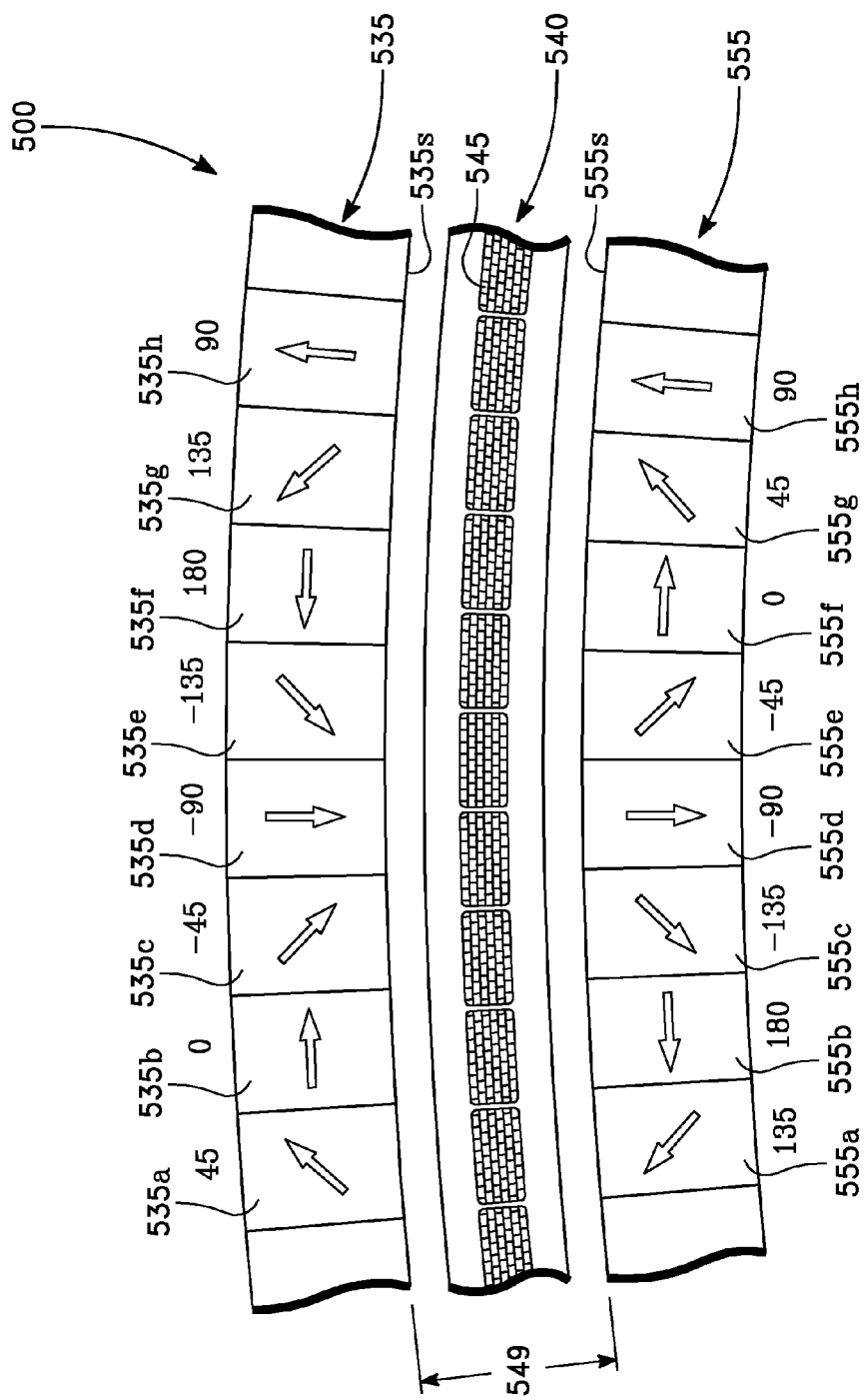
FIG. 4 shows a simplified cut away front view of a portion of a possible another embodiment of a permanent magnet motor.

FIG. 4 shows a simplified cut away front view of a portion 500 of a possible another embodiment of a permanent magnet motor. In this embodiment, the orientation of the magnetic moments of successive permanent magnets in the outer rotor array 535 are each rotated 45 degrees or π/4 radians, with respect to an adjacent magnet. Similarly, the orientation of the magnetic moments of successive permanent magnets in the inner rotor array 355 are each rotated 45 degrees with respect to an adjacent magnet. The outer magnets 535 are oriented such that they reinforce at −90 degrees at magnet 535d and cancel at 90 degrees at magnet 535h at the gap surface 535s in the outer array 535, and the inner magnets 555 are oriented such that they reinforce at 90 degrees at magnet 555h and cancel at −90 degrees at magnet 555d at the gap surface 555s.

An advantage of orienting the magnets with 45 degrees of separation, and including 90 degree orientation with respect to the stator winding 545, as shown in FIG. 4, is that it provides a higher back EMF than a 60, 30, −30, −60 degree orientations. In some embodiments the embodiment of FIG. 4 provided about a 10% higher back EMF than a 60, 30, −30, −60 degree orientations.

Embodiments and implementation of the present invention are not limited to the motor embodiments shown in FIGS. 3 and 4. The magnet arrays described herein may be applied to various axial or radial motors, or to other Halbach array/cylinder/sphere devices, or the like, including wigglers, and are not limited to use in dual rotor motors. As used herein, array is intended to cover cylinders, spheres, or the like, utilizing the array structure. Furthermore, embodiments and implementations are not limited to aircraft motors, but may also be employed in automobiles, machinery, instruments, space, or other applications.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A magnet array for a motor comprising an array of permanent magnets being arranged such that flux from the permanent magnets reinforce on one side of the array and substantially cancel on an opposite side of the array, wherein the magnets are arranged such that the magnetic moments of adjacent magnets are oriented in directions separated by about 45 degrees, and such that a magnet within the array comprises a magnetic moment oriented generally perpendicular to the reinforcing side of the array, and comprising an ironless winding adjacent to the array comprising conductor bundles having a generally rectangular cross-section arranged such that a long side of the generally rectangular cross-section is transverse to a direction of magnetic field lines of the magnet having the generally perpendicular magnetic moment.

2. The magnet array of claim 1, further comprising flux concentrators located on the reinforcing side of the array at magnets having the generally perpendicular magnetic moment.

3. The magnet array of claim 2, wherein the flux concentrators comprise a magnetic material having a higher flux density than the magnets.

4. The magnet array of claim 3, wherein the flux concentrators comprise iron.

5. The magnet array of claim 1, wherein the flux concentrators comprise iron.

6. A motor comprising:
   a) an inner rotor and an outer rotor;
   b) a stator comprising an ironless winding between the inner rotor and the outer rotor;
   c) the inner rotor and the outer rotor each comprising an array of permanent magnets being arranged such that flux from the permanent magnets reinforce on a side of the array facing the stator and substantially canceling on a side of the array opposite the stator, wherein the magnets of the arrays of the inner and outer rotors are arranged such that the magnetic moments of adjacent magnets are oriented in directions separated by about 45 degrees, and such that a magnet within the array comprises a magnetic moment oriented generally perpendicular to the stator side of the array, and
   d) wherein the ironless winding comprises conductor bundles comprising a generally rectangular cross-section arranged such that a long side of the generally rectangular cross-section is transverse to a direction of magnetic field lines of the generally perpendicular magnetic moments of inner and outer arrays.

7. The motor of claim 6, wherein the inner and outer rotors are secured together separated by a gap, and wherein the magnetic moments of the magnets in the arrays are aligned to reinforce magnetic fields across the gap.

8. The motor of claim 7, further comprising flux concentrators located on the reinforcing side of the array at magnets having the generally perpendicular magnetic moment.

9. The motor of claim 8, wherein the flux concentrators comprise a magnetic material having a higher flux density than the magnets.

10. The motor of claim 9, wherein the flux concentrators comprise iron.

11. The motor of claim 8, wherein the flux concentrators comprise iron.

12. A motor comprising:
   a) an inner rotor and an outer rotor with an ironless stator winding therebetween;
   b) the inner and outer rotors each comprise flux concentrators and permanent magnets, the inner rotor and the outer rotor each comprising an array of permanent magnets being arranged such that flux from the permanent magnets reinforce on a side of the array facing the stator and substantially canceling on a side of the array opposite the stator, wherein the magnets of the arrays of the inner and outer rotors are arranged such that the magnetic moments of adjacent magnets are oriented in directions separated by about 45 degrees, and such that a magnet within the array comprises a magnetic moment oriented generally perpendicular to the stator side of the array;
   c) wherein the permanent magnets each comprise a pole surface, the flux concentrators of the inner and outer rotors being located at a pole surface of the magnet having the generally perpendicular magnetic magnet within the array so as to mutually reinforce flux across the winding; and
   d) wherein the ironless stator winding comprises conductor bundles comprising a generally rectangular cross-section arranged such that a long side of the generally rectangular cross-section is transverse to a direction of magnetic field lines of the generally perpendicular magnetic moments of inner and outer arrays.

13. The motor of claim 12, wherein the winding comprises turns each having a width, and wherein the flux concentrators of the inner and outer rotors have a width that is substantially a same width as a single winding turn.

14. The motor of claim 13, wherein the flux concentrators comprise a magnetic material having a higher flux density than the magnets.

15. The motor of claim 13, wherein the flux concentrators comprise iron.

16. The motor of claim 12, wherein the flux concentrators of the inner and outer rotors have a width, the permanent magnets of the inner and outer rotors have a width, and the winding comprises turns each having a width such that a non-fringing density of magnetic field lines across the winding has substantially a same width as the width of a single winding turn.

17. The motor of claim 16, wherein the winding comprises turns each having a width, and wherein the flux concentrators of the inner and outer rotors have a width that is substantially a same width as a single winding turn.

18. The motor of claim 17, wherein the flux concentrators comprise a magnetic material having a higher flux density than the magnets.

19. The motor of claim 18, wherein the flux concentrators comprise iron.

20. The motor of claim 12, wherein the flux concentrators comprise iron.

* * * * *